United States Patent [19]

Bahouth, deceased et al.

[11] 3,894,147

[45] July 8, 1975

[54] METHOD AND COMPOSITION FOR INHIBITING CALCULUS

[75] Inventors: Tayseer George Bahouth, deceased, late of Utica, N.Y.; by Zaher Bahouth, administrator, Utica, N.Y.

[73] Assignee: Colgate-Palmolive Company, New York, N.Y.

[22] Filed: Mar. 2, 1973

[21] Appl. No.: 337,319

[52] U.S. Cl. ................................ 424/57; 424/207
[51] Int. Cl. ............................................. A61k 7/16
[58] Field of Search ............................... 424/49–58

[56] References Cited
UNITED STATES PATENTS
3,309,274   3/1967   Brilliant .............................. 424/49

FOREIGN PATENTS OR APPLICATIONS
1,376,794   9/1964   France

*Primary Examiner*—Richard L. Huff
*Attorney, Agent, or Firm*—Robert L. Stone; Murray M. Grill; Herbert S. Sylvester

[57] ABSTRACT

Calculus formation can be inhibited by contacting the teeth with the reaction product of a higher fatty alcohol having from about 8 to about 14 carbon atoms with phosphorus pentoxide. The anticalculus agents can be incorporated into a variety of oral preparations, including dental creams, mouthwashes, and the like.

9 Claims, No Drawings

METHOD AND COMPOSITION FOR INHIBITING CALCULUS

BACKGROUND OF THE INVENTION

The present invention relates to methods and compositions useful in inhibiting calculus formation.

There have been many theories about causes and prevention of dental caries and calculus; there is literature which suggests that dental plaque is a contributing factor in both. Dental calculus, or tartar as it is sometimes called, is a deposit which forms on the surfaces of the teeth at the gingival margin. Supragingival calculus appears principally in the areas near the orifices of the salivary ducts, e.g., on the lingual surfaces of the lower anterior teeth and on the buccal surfaces of the upper first and second molars, and on the distal surfaces of the posterior molars.

Mature calculus consists of an inorganic portion which is largely calcium phosphate arranged in a hydroxyapatite crystal lattice structure similar to bone, enamel, and dentine. An organic portion is also present.

As the mature calculus develops, it becomes visibly white or yellowish in color unless stained or discolored by some extraneous agency. In addition to being unsightly the undesirable from an aesthetic standpoint, the mature calculus deposits may be a constant source of irritation of the gingiva and thereby are a contributing factor in the development of gingivitis and other diseases of the supporting structures of the teeth.

A number of agents have been employed to control oral conditions by topical application or by use of a dentifrice (i.e., a dental cream or toothpowder), a prophylactic paste composition, or the like. In particular, a wide variety of chemical and biological agents have been suggested in the art to retard calculus formation or to retard calculus after it is formed. Mechanical removal of this material periodically by the dentist is, of course, routine dental office procedure.

SUMMARY OF THE INVENTION

The fatty alcohols that can be reacted with phosphorus pentoxide to form the organic phosphorus compound mixture useful in inhibiting calculus formation include the aliphatic alcohols having between 8 and 14 carbon atoms. Decyl and dodecyl are the preferred alcohols to be used. Mole ratios of alcohol to phosphorus pentoxide are typically at least stoiciometric, and the preferred mole ratio of alcohol to phosphorus pentoxide is 2:1. The ratios are herein defined with regard to the amount necessary to theoretically form 100% dialkyl pyrophosphate, it being understood that a mixture of compounds is formed rather than 100% dialkyl pyrophosphate.

It is probable that the reaction product includes, as the principal component (i.e., at least about 50% by weight) of the mixture, a dialkyl pyrophosphate of the following structural formula:

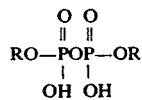

Depending on the mole ratios of the reactants, other components present may include alkyl dihydrogen phosphate, dialkyl hydrogen phosphate, trialkyl phosphate, as well as phosphoric acid and polyphosphates including triphosphates and trimetaphosphates.

Broadly, the present invention includes a method of controlling oral conditions and particularly inhibiting calculus formation comprising contacting the teeth with an orally acceptable composition of matter containing the herein defined mixutre of the present invention in intimate mixture with a carrier therefor. The carrier is generally selected from the group consisting of dental creams, toothpowders, liquid dentifrices, mouthwashes, edible pharmaceutical preparations (for example, prophylactic tablets and lozenges for sucking), foodstuffs, and beverages.

The most convenient oral preparations to which the organic pyrophosphates of the present invention can be added are mouthwashes and dentifrices.

Any suitable substantially water-insoluble polishing agent may be employed in the preparation of dentifrice compositions, such as toothpastes, powders, creams, and the like, in accordance with the present invention. There is a relatively large number of such materials known in the art. Representative materials include, for example, dicalcium phosphate, tricalcium phosphate, insoluble sodium metaphosphate, aluminum hydroxide, magnesium carbonate, calcium carbonate, calcium pyrophosphate, calcium sulfate, bentonite, etc., including suitable mixtures thereof. Colloidal dehydrated silica or sodium aluminosilicates may also be used, particularly if the dentifrice is a clear gel. It is preferred to use the water-insoluble phosphate salts as the polishing agents and, more particularly, insoluble sodium metaphosphate and/or a calcium phosphate such as dicalcium phosphate dihydrate. In general, these polishing agents will comprise a major proportion by weight of the solid ingredients. The polishing agent content is variable, but will generally be up to about 95% by weight of the total composition. In the case of a dental cream, such polishing agents will generally be about 20–75% by weight of the composition, whereas in toothpowders and dental tablets the polishing agents will usually be in greater proportion, such as about 70–95%.

In the preparation of toothpowders, it is ususally sufficient to admix mechanically, i.e., by milling, the various solid ingredients, in appropriate quantities and particle sizes.

In dental cream formulations, the liquids and solids should necessarily be proportioned to form a creamy mass of desired consistency which is extrudable from an aerosol container or a collapsible, e.g., aluminum or lead, tube. In general, the liquids in the dental cream will comprise chiefly water, glycerine, aqueous solutions of sorbitol, propylene glycol, polyethylene glycol 400, etc., including suitable mixtures thereof. It is advantageous usually to use a mixture of both water and a humectant or binder such as glycerine or sorbitol to keep the formulation from hardening. The total liquid content will generally be about 20–75% by weight of the formulation. It is preferred to use also a gelling agent in dental creams such as the natural and synthetic gums and gum-like materials, e.g., Irish moss, gum tragacanth, sodium carboxymethylcellulose, polyvinylpyrrolidone, starch, and the like, usually in an amount up to 10%, and preferably abbout 0.2 to 5% of the formulation. These gelling agents aid in imparting a desirable consistency to the dental cream.

In other compositions such as mouth rinses and the like, the aqueous vehicle may comprise from about 20 to as much as 99% of the formulations. In mouthwashes, about 5–30% of alcohol, such as ethyl alcohol, is typically present. Organic surfaceactive agents used in the compositions of the present invention may be anionic, nonionic, cationic, or ampholytic in nature, and it is preferred to employ as the surface active agent a detersive material which imparts to the composition both detersive and foaming properties. Suitable such detergents are water-soluble salts of higher fatty acid monoglyceride monosulfates, such as the sodium salt of the monosulfated monoglyceride of hydrogenated coconut oil fatty acids, higher alkyl sulfates, such as sodium laurylsulfate, alkyl aryl sulfonates, such as sodium dodecyl benzene sulfonate, higher alkyl sulfoacetates, higher fatty acid esters of 1,2 dihydroxypropane sulfonates, and the substantially saturated higher acyl amides of lower aliphatic amino carboxylic acid compounds, such as those having from about 12 to about 16 carbons in the fatty acid, alkyl, or acyl radicals, and the like. Examples of the last mentioned amides are N-lauroyl sarcosine, and the sodium potassium, and ethanolamine salts of N-lauroyl, N-myristoyl, or N-palmitoyl sarcosinates, which should be substantially free from soap or similar higher fatty acid material which tends to substantially reduce the effect of these compounds. The use of these sarcosinate compounds in oral compositions of the present invention is particularly advantageous, since these materials exhibit a prolonged and marked effect in the inhibition of acid in the oral cavity due to carbohydrates, in addition to exerting some reduction in the solubility of tooth enamel in acid solutions. Desirable surface active effect is obtained with a long chain fatty acid monoglyceride sulfonate such as the sodium salt of hydrogenated coconut oil fatty acid monoglyceride sulfonate used alone or in combination with sodium lauryl sulfate.

Other suitable surface active materials include nonionic agents such as condensates of sorbitan monostearate with up to 60 moles of ethylene oxide, condensates of ethylene oxide with propylene oxide condensates of propylene glycol ("Pluronics"), and cationic surface active germicides and antibacterial compounds such as di-isobutylphenoxyethoxyethyl dimethyl benzyl ammonium chloride, benzyl dimethyl stearyl ammonium chloride, tertiary amines having one fatty alkyl group of from 12 to 18 carbon atoms and two polyoxyethylene groups attached to the nitrogen (typically containing a total of from about 2 to 50 ethenoxy groups per molecule) and salts thereof with acids. It is preferred to use from about 0.05 to about 5% by weight of the foregoing surface active materials in the instant oral preparations.

A fluorine containing agent, such as stannous fluoride, sodium monofluorophosphate, or sodium fluoride may also be incorporated into oral compositions containing the organic pyrophosphates of the present invention. The preferred fluorine containing agents are stannous fluoride and sodium monofluorophosphate. The amount of fluorine containing agent may be varied, but should range between about 0.01 and 1.0%. The preferred fluoride content is about 0.076 to about 0.3%. Thus, stannous fluoride, when employed, would be typically in amount of about 0.04 to 4.1%, preferably about 0.3 to 1.24%, say 0.4%. Sodium monofluorophosphate, when used, would be typically in amount of about 0.076 to 7.6%, preferably about 0.57 to 2.3%, say 0.76%.

Various other materials may be incorporated into the oral preparations of the present invention. Examples thereof are coloring or whitening agents, preservative, silicones, chlorophyll compounds, ammoniated materials such as urea, diammonium phosphate, and mixtures thereof, and other constituents. These adjuvants are incorporated in the instant compositions in amounts which do not substantially adversely affect the properties and characteristics suitably selected and used in proper amount depending upon the particular type of preparation involved.

Any suitable flavoring or sweetening materials may be employed in formulating a flavor for the compositions of the present invention. Examples of suitable flavoring constituents include the flavoring oils, e.g., oils of spearmint, wintergreen, sassafras, clove, sage, eucalyptus, marjoram, cinnamon, lemon, and orange as well as methylsalicylate. Suitable sweetening agents include sucrose, lactose, maltose, sorbitol, and saccharin. Suitably, flavor and sweetening agent may together comprise from about 0.01 to 5% or more of the compositions of the present invention.

The organic pyrophosphates are present in oral compositions in amounts ranging from about 0.05 to about 1.00%, with a preferred range being from about 0.1 to about 0.75%.

DESCRIPTION OF THE PREFERRED EMBODIMENTS

The following examples are given to illustrate orally acceptable compositions containing the organic pyrophosphates of the present invention. The examples are presented primarily for the purpose of illustration, and any enumeration or details contained therein are not to be interpreted as a limitation on the invention except as indicated in the appended claims.

EXAMPLE I

A calculus inhibiting dentifrice was formulated from the following ingredients.

|  | Percent by Weight |
| --- | --- |
| Glycerine, c.p. 99.3% | 22.00 |
| Tetrasodium pyrophosphate | 0.25 |
| Carboxymethyl cellulose | 0.85 |
| Sodium saccharin | 0.20 |
| Sodium benzoate | 0.50 |
| Sodium lauryl sulfate | 2.00 |
| Calcium carbonate, precipitated | 5.00 |
| Calcium hydrogen phosphate dihydrate | 46.75 |
| Flavor | 0.80 |
| Reaction mixture of dodecyl alcohol and phosphorus pentoxide | 0.50 |
| Distilled water | 21.15 |

EXAMPLE II

A mouth rinse formulation was made up from the following ingredients:

|  | Percent by Weight |
| --- | --- |
| Ethyl alcohol (containing flavor) | 15.00 |
| Nonionic detergent | 1.00 |
| Glycerine c.p. 99.3% | 10.00 |
| Water, deionized | 73.18 |
| Sodium saccharin | 0.02 |
| FD&C Yellow No. 5(0.1% solution) | 0.30 |

| -Continued | |
|---|---|
| FD&C Blue No. 1(0.1% solution) | 0.30 |
| Reaction mixture of dodecyl alcohol and phosphorus pentoxide | 0.20 |

The solution was adjusted to pH 7 with sodium hydroxide.

Similar oral compositions may be prepared wherein the reaction mixture is formed from decyl alcohol and phosphorus pentoxide.

EXAMPLE III

Reaction mixtures of phosphates of the present invention were tested for calculus inhibition in rats. Litter-mated Sprague-Dawley rats, 60 days old, in groups of 15 males and 15 females, were fed a Zipkin-McClure calculus diet. For 6 weeks, the teeth of each animal were swabbed for 30 seconds each day with a test solution, or water for the control group. The animals were then sacrificed, defleshed, and scored by Baer's method for calculus. The results were analyzed by Student's $t$ test for statistical significance. The following statistically significant results were obtained:

| Alcohol reacted with phosphorus pentoxide | Concentration | Calculus Reduction | Statistical Significance |
|---|---|---|---|
| Dodecyl alcohol | 0.2% | −26.5% | 99% |
| Dodecyl alcohol | 0.1% | −20.9% | 99% |
| Decyl alcohol | 0.1% | −26.4% | 99% |

It can thus be seen from the above that the reaction products of the present invention are effective against calculus in animals.

What is claimed is:

1. A method of inhibiting calculus formation by contacting the teeth with an effective amount of at least 0.1% of a dialkyl pyrophosphate having from about 8 to 14 carbon atoms, in the alkyl groups.

2. The method of claim 1 wherein the mole ratio of higher fatty alcohol to phosphorus pentoxide is about 2:1.

3. The method of claim 1 wherein the higher fatty alcohol is decyl alcohol.

4. The method of claim 1 whereini the higher fatty alcohol is dodecyl alcohol.

5. An oral composition for inhibiting calculus formation comprising a dentifrice and an effective amount of at least 0.1% of a dialkyl pyrophosphate having from about 8 to 14 carbon atoms in the alkyl groups.

6. The oral composition of claim 5 wherein the higher fatty alcohol is decyl alcohol.

7. The oral composition of claim 5 wherein the higher fatty alcohol is dodecyl alcohol.

8. The oral composition of claim 5 wherein a substantially water-insoluble polishing agent is present and said oral composition is a dentifrice.

9. The oral composition of claim 5 wherein said reaction product is in a water-alcohol medium and said composition is a mouthwash.

* * * * *